(12) United States Patent
Ashkar et al.

(10) Patent No.: US 12,555,299 B2
(45) Date of Patent: Feb. 17, 2026

(54) SCALABLE GRAPHICS PROCESSING USING DYNAMIC SHADER ENGINE ALLOCATION

(71) Applicant: ADVANCED MICRO DEVICES, INC., Santa Clara, CA (US)

(72) Inventors: Alexander Fuad Ashkar, Winter Park, FL (US); Manu Rastogi, Casselberry, FL (US); Ping Jing, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 126 days.

(21) Appl. No.: 18/205,174

(22) Filed: Jun. 2, 2023

(65) Prior Publication Data
US 2024/0404167 A1    Dec. 5, 2024

(51) Int. Cl.
G06T 15/00    (2011.01)
(52) U.S. Cl.
CPC .................................. G06T 15/005 (2013.01)
(58) Field of Classification Search
CPC ..................................................... G06T 15/005
USPC ................................ 345/212, 419, 426, 522
See application file for complete search history.

(56) References Cited

U.S. PATENT DOCUMENTS

| | | | |
|---|---|---|---|
| 5,452,401 A | 9/1995 | Lin | |
| 2010/0033483 A1* | 2/2010 | Stewart | G06T 1/60 345/426 |
| 2010/0295852 A1* | 11/2010 | Yang | G06F 1/3228 345/212 |
| 2014/0125670 A1* | 5/2014 | Saulters | G06T 15/005 345/422 |
| 2016/0042549 A1* | 2/2016 | Li | G06T 1/20 345/426 |
| 2016/0054782 A1 | 2/2016 | Kaburlasos et al. | |
| 2018/0286115 A1* | 10/2018 | Surti | G06T 5/20 |
| 2021/0065423 A1* | 3/2021 | Oldcorn | G06T 15/005 |
| 2021/0272229 A1* | 9/2021 | Mccrary | G06T 15/005 |
| 2021/0286626 A1* | 9/2021 | Maiyuran | G06F 9/30076 |
| 2023/0077865 A1* | 3/2023 | Oxford | G06F 9/45558 345/522 |

FOREIGN PATENT DOCUMENTS

| | | |
|---|---|---|
| WO | 2012009252 | 1/2012 |
| WO | 2019027111 | 2/2019 |

OTHER PUBLICATIONS

International Search Report and Written Opinion issued in Application No. PCT/US2024/031376, mailed Sep. 10, 2024, 10 pages.

* cited by examiner

*Primary Examiner* — Prabodh M Dharia (57) ABSTRACT

Techniques are described for implementing selective activation and deactivation of a dynamically allocated subset of shader engines, such as based on application-based profile information and/or on an active system power configuration. Instructions for execution are received from an application associated with a first application profile. Based on the application profile, a quantity of activated shader engines in a plurality of shader engines is modified. The quantity of activated shader engines is further modified responsive to receiving additional instructions from a second application, and/or to receiving one or more indications of an altered active system power configuration.

20 Claims, 4 Drawing Sheets

SCALABLE GRAPHICS PROCESSING USING DYNAMIC SHADER ENGINE ALLOCATION

BACKGROUND

An Accelerated Processing Unit (APU) typically combines functions of a central processing unit (CPU) and a graphics processing unit (GPU) in a single package, such as a chip or die. APUs generally improve system performance and power efficiency in a computing system by eliminating the need for a separate graphics card, which can consume significant power and produce additional heat. APUs are commonly used in various portable computing devices (e.g., laptop computers, tablet computers, mobile computing, etc.) in which power consumption and size are critical factors for improving user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Larger APUs typically include many Work Group Processors (WGPs) across multiple Shader Engines (SEs). This architecture provides various performance benefits. However, having more hardware resources available creates issues with power consumption, such as when executing workloads associated with relatively low concurrent active contexts (CAC). Such workloads typically utilize very little graphics processing resources to accomplish their task efficiently, often utilizing just a few WGPs within a single SE. The resulting power utilization causes the processor to operate at a non-optimal performance-to-power ratio, due at least in part to a relatively large leakage of power consumed within idle portions of the graphics pipeline, as well as power wasted on the clock distribution path to those portions.

Previous solutions involve throttling one or more system clock signals or system voltages according to application needs. However, merely executing at slower frequencies does not enable operations at minimal power envelopes, thereby reducing battery life and contributing to a diminished user experience. In addition, such solutions have enabled or disabled shader resources statically, such as via hardware fusing methods performed only at system initialization (boot time), thereby preventing any runtime modifications to scale the shader engine resources available to the APU.

Embodiments of techniques described herein enable scaling SE resources based on application profiles associated with applications generating instructions for execution, such as to modify a quantity of activated shader engines in a larger plurality of shader engines based on the particular application providing instructions for execution. In certain embodiments, shader engine allocation and deallocation is performed dynamically and software-controlled, such as by a user mode driver (UMD) and/or kernel mode driver, and implemented by the run list controller (RLC) and command processor (CP).

For example, in certain embodiments dynamic SE activation is done using application heuristics to analyze and profile many SE allocation configurations for various popular applications (e.g., gaming applications, productivity applications, visual production applications, etc.). In certain embodiments, information regarding such configurations is built into one or more software driver(s) to selectively activate (e.g., provide power to) and/or deactivate (e.g., substantially deprive of power) a quantity of shader engines (e.g., a subset of a larger plurality of shader engines) to achieve an optimal performance-to-power operating point. By scaling graphics pipeline resources (e.g., activated shader engines) based on individual application requirements, the APU can enable or disable SEs dynamically based on these software-indicated requirements to keep the graphics pipeline operating at substantially optimal power efficiencies.

In certain embodiments, the quantity of activated shader engines to use for an indicated application is further determined by the APU based on a power configuration of the computing system. For example, in embodiments and scenarios in which ample power is available, the APU may be configured to optimize the GPU for performance by allowing the APU to use more internal resources to achieve higher frame rates at the expense of additional power. More generally, when operating under AC power, the APU can optimize for performance, and while under DC power, it can optimize power consumption, such as in order to extend battery life. In both scenarios, and in any power configuration, performance per watt is optimized or improved by the APU.

As used herein, the power of a shader configuration refers to a relative quantity of activated (powered) shader engines in a plurality of shader engines, such that a higher-powered shader configuration includes a greater quantity of activated shader engines than a lower-powered shader configuration. Thus, in at least some embodiments, a shader engine referred to herein as deactivated is substantially unpowered, such as to mitigate or avoid leakage power consumed within idle portions of the graphics pipeline, as well as power wasted on any associated portions of a clock distribution path.

In certain embodiments, switching from a lower-powered shader configuration to a higher-powered shader configuration includes restoring states saved previously to all activated SEs, thereby using information from shader engines activated in the lower-powered shader configuration to initialize and program one or more newly added SEs in the higher-powered shader configuration. For example, in various embodiments the RLC and CP initializes and programs newly added shader engines without additional software assistance from the software driver or the application itself, such as by provisioning shader engines that are to be newly activated with state information from one or more previously activated shader engines.

It will be appreciated that while various embodiments discussed herein employ described techniques in the context of a particular APU processing system with specific components, such described techniques may in other embodiments be utilized in additional contexts and circumstances, such as in and/or by a graphics processing unit (GPU), including in discrete GPUs (in which one or more GPUs are included in a separate package and communicatively coupled to one or more CPUs via hardware interface) and integrated GPUs (in which one or more GPUs are integrated into a single package with one or more CPUs).

Figure 1:
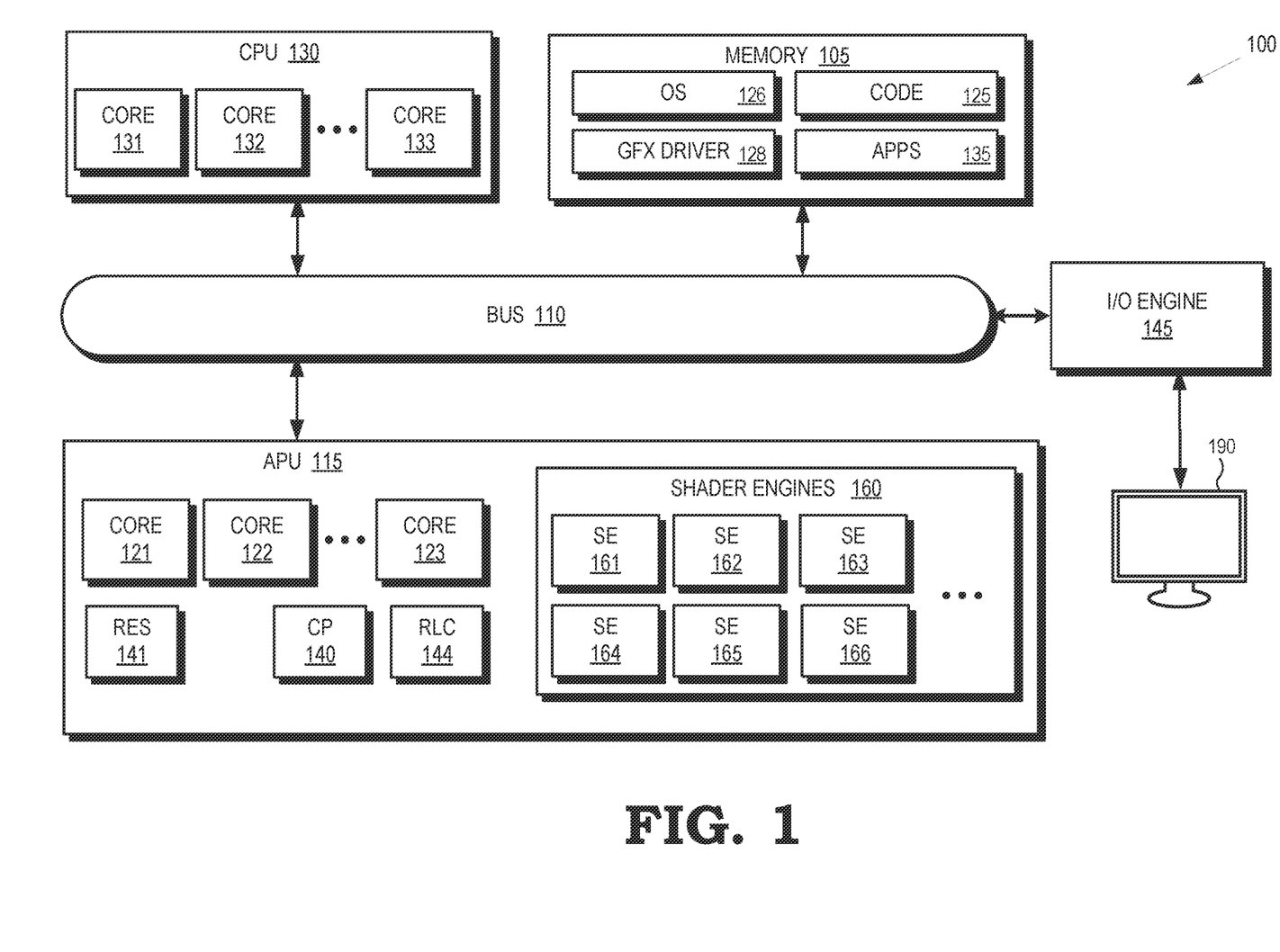
FIG. 1 is a block diagram of a processing system 100 implementing selective activation and deactivation of a dynamically allocated subset of shader engines, in accordance with some embodiments.

FIG. 1 is a block diagram of a processing system 100 implementing selective activation and deactivation of a dynamically allocated subset of shader engines, in accordance with some embodiments. The processing system 100 includes or has access to a memory 105 or other storage component implemented using a non-transitory computer-readable medium, for example, a dynamic random-access memory (DRAM). However, in embodiments, the memory 105 is implemented using other types of memory including, for example, static random-access memory (SRAM), non-volatile RAM, and the like. According to embodiments, the memory 105 includes an external memory implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in various embodiments, employed at least in part at accelerated processing unit (APU) 115, also referred to as an accelerated processor. The APU 115 includes, for example, any of a variety of parallel processors, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. In some embodiments, the APU 115 renders images according to one or more applications 135 (e.g., shader programs) for presentation on a display 190. For example, the APU 115 renders objects (e.g., groups of primitives) according to one or more shader programs to produce values of pixels that are provided to the display 190, which uses the pixel values to display an image that represents the rendered objects.

To render the objects, the APU 115 implements a plurality of processor cores 121 to 123 that execute instructions concurrently or in parallel from, for example, one or more applications 135. For example, the APU 115 executes instructions from a shader program, raytracing program, graphics pipeline, or both using a plurality of processor cores 121 to 123 to render one or more objects. Though in the example implementation illustrated in FIG. 1, three processor cores (121 to 123) are presented representing an N number of cores, the number of processor cores 121 to 123 implemented in the APU 115 is a matter of design choice. As such, in other implementations, the APU 115 can include any number of processor cores 121 to 123. Some implementations of the APU 115 are used for general-purpose computing. The APU 115 executes instructions such as program code 125 (e.g., shader code, raytracing code) for one or more applications 135 (e.g., shader programs, raytracing programs) stored in the memory 105, and the APU 115 stores information in the memory 105 such as the results of the executed instruction. In the depicted embodiment, the memory 105 further includes some or all of an operating system (OS) 126, such as to provide an interface between the applications 135 and graphics driver 128.

Each processor core 121 to 123 is communicatively coupled to one or more respective sets of compute unit resources (RES) 141. For example, each compute unit of a processor core 121 to 123 includes or is otherwise coupled to a respective set of compute unit resources within the RES 141. The RES 141, for example, is configured to store values, register files, operands, instructions, variables, result data (e.g., data resulting from the performance of one or more operations), flags, or any combination thereof necessary for, aiding in, or helpful for performing one or more operations indicated in one or more instructions from an application 135. In various embodiments, the processing system 100 includes any number of sets of compute unit resources 141 for use by the processor cores 121 to 123.

The APU 115 further includes a plurality of shader engines 160, which in the depicted embodiment includes shader engines 161, 162, 163, 164, 165, 166. In various embodiments, shader engines 160 may include any number of shader engines, with the number of shader engines 160 implemented in the APU 115 a matter of design choice. Each of the shader engines 160 includes one or more workgroup processors (WGPs), omitted here for clarity.

The APU 115 includes a command processor (CP) 140 (also referred to as a scheduler) and Run List Controller (RLC) 144, both of which include in various embodiments hardware-based circuitry, software-based circuitry, or both. The RLC 144 is responsible for managing and scheduling the execution of a list of commands that are sent to the APU 115. These commands, also known as a "run list," are typically a sequence of low-level instructions that specify various operations (e.g., drawing triangles, setting colors, or updating textures). The RLC ensures that the commands in the run list are executed in the correct order and that any needed resources of RES 141 are available, while CP 140 is responsible for interpreting and executing individual commands within the run list, such as by decoding the commands and translating those commands into the appropriate hardware instructions for execution by one or more shader engines of the shader engines 160.

The processing system 100 also includes a central processing unit (CPU) 130 that is connected to the bus 110 and therefore communicates with the APU 115 and the memory 105 via the bus 112. The CPU 130 implements a plurality of processor cores 131 to 133 that execute instructions concurrently or in parallel. In some embodiments, one or more of the processor cores 131 to 133 each operate as one or more compute units (e.g., Single Instruction Multiple Data or SIMD units) that perform the same operation on different data sets. Though in the example embodiment illustrated in FIG. 1, three processor cores (131 to 133) are presented representing an M number of cores, the number of processor cores 131 to 133 implemented in the CPU 130 is a matter of design choice. As such, in other embodiments, the CPU 130 can include any number of processor cores 131 to 133. In some embodiments, the CPU 130 and the APU 115 have an equal number of processor cores, while in other embodiments, the CPU 130 and the APU 115 have a different number of processor cores. The processor cores 131 to 133 execute instructions such as program code 125 stored in the memory 105 and the CPU 130 stores information in the memory 105 such as the results of the executed instructions.

The CPU 130 is also able to initiate graphics processing by issuing draw calls to the APU 115. In embodiments, the CPU 130 implements multiple processor cores (not shown in FIG. 1 in the interest of clarity) that execute instructions concurrently or in parallel.

An input/output (I/O) engine 145 includes hardware and software to handle input or output operations associated with the display 190, as well as other elements of the processing system 100 such as keyboards, mice, printers, external disks, and the like. The I/O engine 145 is coupled to the bus 110 so that the I/O engine 145 communicates with the memory 105, the APU 115, or the CPU 130.

Figure 2:
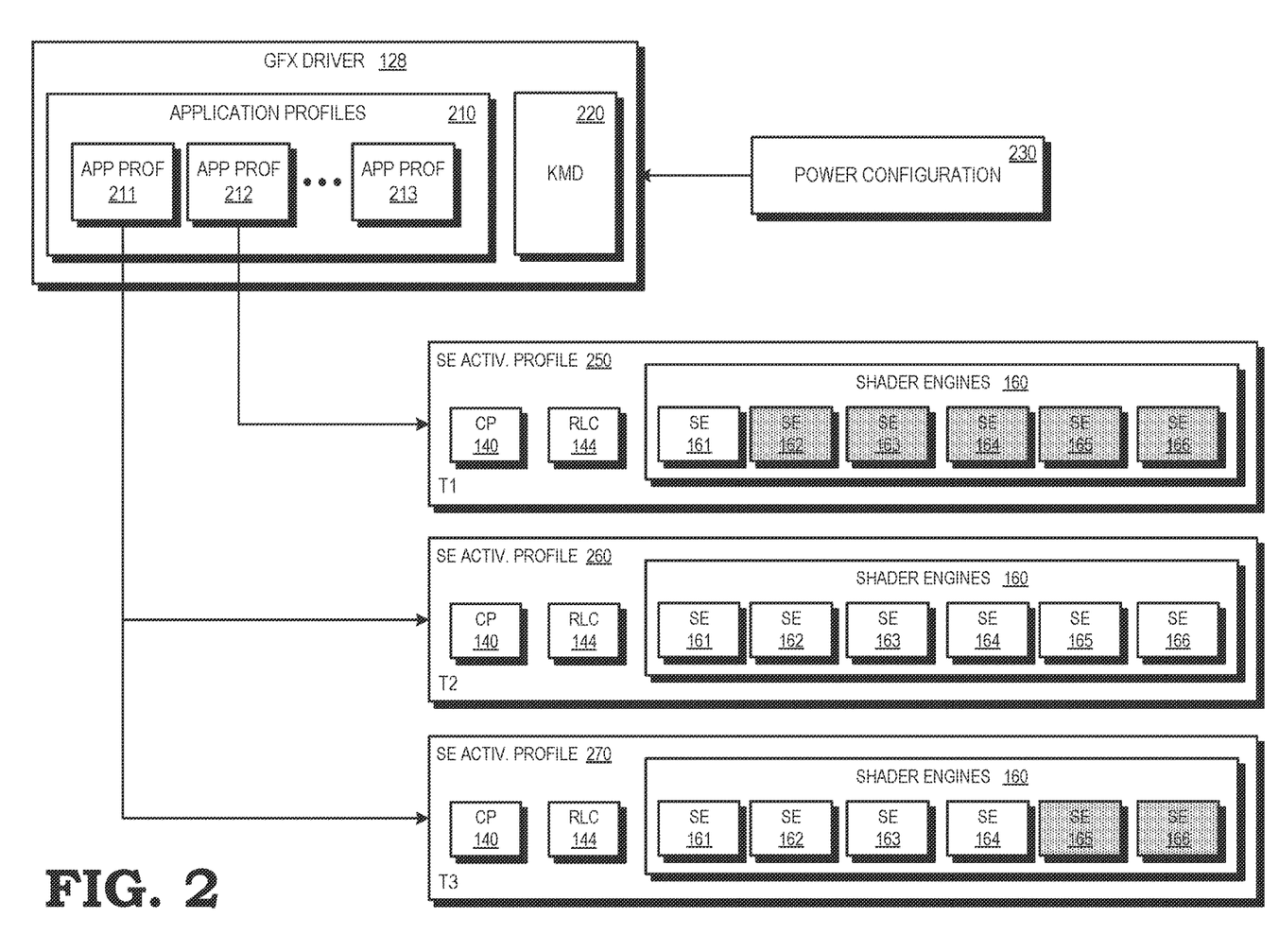
FIG. 2 illustrates application-based activation and deactivation of dynamically allocated subsets of shader engines, in accordance with some embodiments.

FIG. 2 illustrates application-based activation and deactivation of dynamically allocated subsets of shader engines, in accordance with some embodiments. With continuing reference to the processing system 100 of FIG. 1, in the depicted embodiment the graphics driver 128 includes a plurality of application profiles 210, individually identified as an application profile 211, 212, . . . , 213. In various embodiments, application profiles 210 may include any number of application profiles. The graphics driver 128 further includes a kernel mode driver (KMD) 220.

At a first time T1, the APU 115 is executing instructions on behalf of an application that is associated with application profile 212. The application profile 212 is associated with, for purposes of this example, a text-based application that utilizes few graphics rendering resources. Based on information to that effect within the application profile 212, the command processor 140 instructs the run list controller 144 to activate (provide operational power to) only a single shader engine 161, leaving shader engines 162, 163, 164, 165, and 166 deactivated and therefore substantially unpowered in a first shader engine activation profile 250. Thus, instructions received from the text-based application associated with application profile 212 are executed using only the single activated shader engine 161.

At a second later time T2, the APU 115 receives one or more instructions on behalf of a second application that is associated with application profile 211. For purposes of this example, application profile 211 is associated with a gaming application that heavily utilizes 3D rendering during gameplay. Based on information to that effect within the application profile 211, the command processor 140 instructs the run list controller 144 to utilize all shader engines 160 in a new shader engine activation profile 260, such that each of the shader engines 162, 163, 164, 165, and 166 that were deactivated in shader engine activation profile 250 are to be initialized and activated (provided with operational power) for use in executing instructions received from, or on behalf of, the gaming application associated with application profile 211.

In certain embodiments, switching from the lower-powered shader engine activation profile 250 to the higher-powered shader engine activation profile 260 includes providing state information from the already activated SE 161 to each of the newly activated SEs 162, 163, 164, 165, and 166. For example, in an embodiment, after the RLC has completed enabling SEs 162, 163, 164, 165, and 166, it sends a command to the CP to instruct it to reinitialize the state for the entire system using state information from SE 161, which will include the newly activated shader engines. In this manner, CP 140 and RLC 144 initializes and programs the newly added SEs 162, 163, 164, 165, and 166 without additional software assistance from the graphics driver 128 or the application associated with application profile 211.

At a third later time T3, while the APU 115 is still executing instructions on behalf of the gaming application associated with application profile 211, the APU 115 receives a notification of an alteration to active system power configuration 230. In various embodiments, the notification of the active system power configuration 230 may be proactively sent by one or more power monitoring components communicatively coupled to the APU, may be polled from one or more registers or memory locations, or received in some other manner.

For example, in an embodiment, KMD 220 sends a message to CP 140 instructing it that an SE reconfiguration is required. In response, the CP 140 unmaps SE hardware queues and instructs the RLC 144 to perform the reconfiguration of the activated shader engines of SEs 161, 162, 163, 164, 165, 166. Following that reconfiguration, the RLC sends a completion response, causing CP 140 to remap the prior SE queues and resume the reconfigured system.

For purposes of this example, at time T3 a notification (not shown) is received by the APU 115 indicating that the active system power configuration 230 has transitioned from a first configuration, in which the plurality of shader engines 160 is coupled to an alternating current (AC) power source, to a second configuration, in which the plurality of shader engines 160 is coupled to a direct current (DC) power source. Based on the currently active application profile 211 and on the active system power configuration, CP 140 instructs RLC 144 to deactivate shader engines 165, 166 in shader engine activation profile 270, leaving shader engines 161, 162, 163, 164 activated. In this manner, the APU 115 optimizes or improves system performance per watt based on both the active application and on the active system power configuration.

In certain embodiments, switching from the higher-powered shader engine activation profile 260 to the lower-powered shader engine activation profile 270 includes clearing state information from SEs 165, 166 prior to deactivating those shader engines. For example, in the depicted embodiment a drain command is issued by the command processor 140 to RLC 144, such as to ensure that no shader waves or events being processed by SEs 165, 166 are stored as part of their respective state information.

Figure 3:
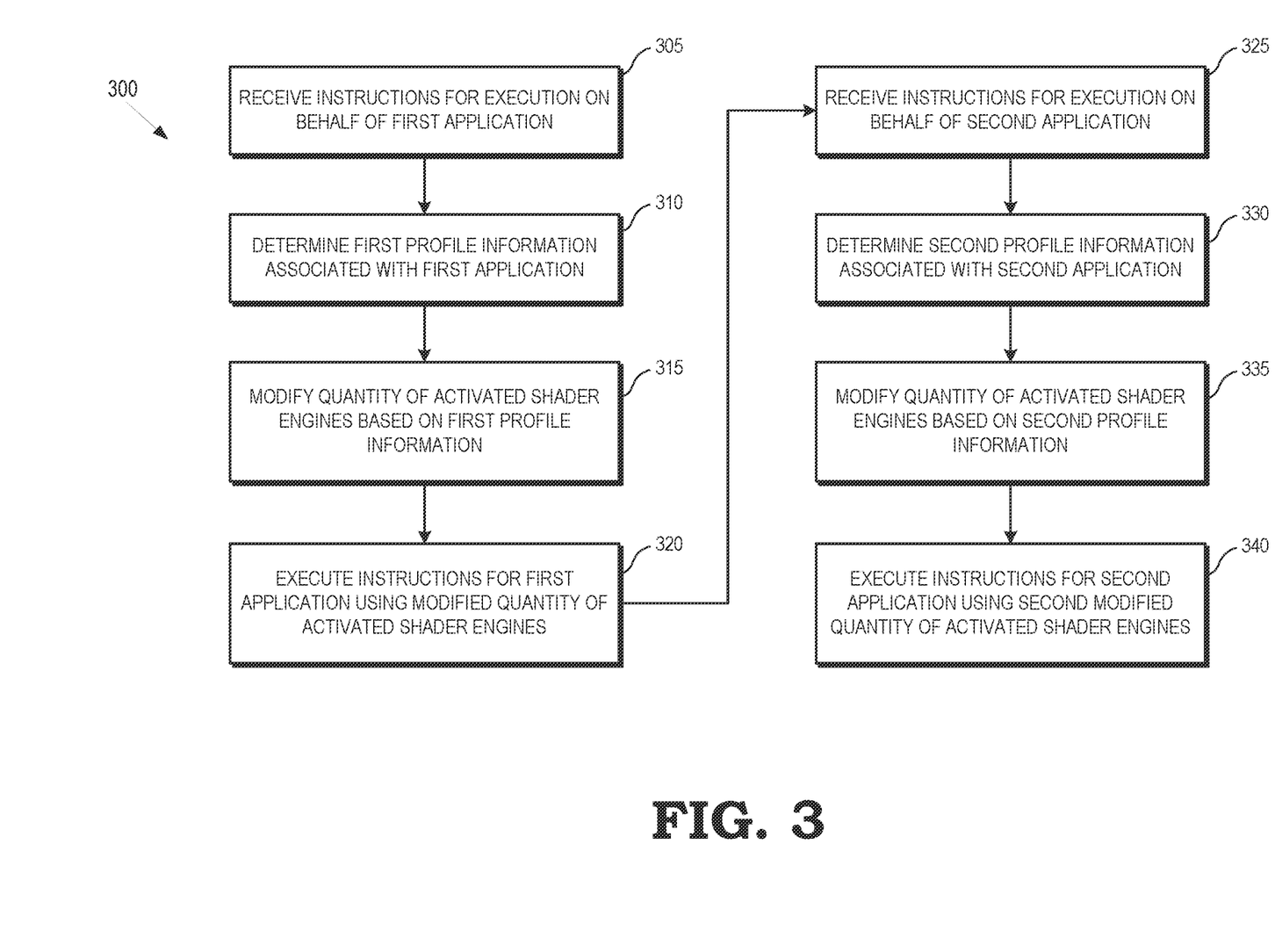
FIG. 3 illustrates an operational routine for selectively activating and deactivating dynamically allocated subsets of shader engines based on application profiles, in accordance with some embodiments.

FIG. 3 illustrates an operational routine for selectively activating and deactivating dynamically allocated subsets of shader engines based on application profiles, in accordance with some embodiments. The routine 300 may be performed, for example, by an APU (e.g., APU 115 of FIG. 1) when receiving instructions for execution (e.g., instructions that comprise at least a portion of program code 125 of FIG. 1) on behalf of one or more of multiple applications (e.g., applications 135 of FIG. 1), such as based on one or more application profiles (e.g., application profiles 210 of FIG. 2).

The routine 300 begins at block 305, in which the APU receives instructions for execution on behalf of a first application. The routine 300 proceeds to block 310.

At block 310, the APU determines profile information associated with the first application (first profile information). In certain embodiments, and as discussed elsewhere herein, the profile information may be stored as part of a software driver (e.g., graphics driver 128 of FIGS. 1 and 2). In various embodiments, the first profile information may be directly associated with the first application, or may be indirectly associated with the first application, such as if the first application is identified as having an application type that corresponds to one or more additional applications associated with the determined first profile information. For example, the APU may determine that the application is a text-based application (word processor, text editor, etc.), a 2D graphical application presenting purely graphical content or a combination of graphical and textual content (e.g., a web browser), a gaming application presenting rendered 3D content, etc. Once the profile information associated with the first application has been determined, the routine 300 proceeds to block 315.

At block 315, the APU modifies a quantity of activated shader engines in a plurality of shader engines based on the determined first profile information. In various embodiments, modifying the quantity of activated shader engines may include one or more additional processes to properly save or release state information associated with shader engines to be activated or deactivated. For example, as discussed elsewhere herein, in certain embodiments increasing the quantity of activated shader engines includes provisioning one or more newly activated shader engines with state information from one or more shader engines that were previously activated, such as to initialize the newly activated shader engines. In contrast, in various embodiments decreasing the quantity of activated shader engines includes clearing state information from a set of one or more shader engines prior to deactivating those shader engines, such as by executing a drain command to ensure that no shader waves or events are saved as part of those to-be-deactivated shader engines' state information. The routine 300 proceeds to block 320.

At block 320, the APU executes the instructions on behalf of the first application using the modified quantity of activated shader engines. The routine 300 proceeds to block 325.

At block 325, the APU receives instructions for execution on behalf of a second application. The routine 300 proceeds to block 330.

At block 330, the APU determines profile information associated with the second application (second profile information). As with the profile information associated with the first application that was determined in block 310, the second profile information may be stored as part of a software driver (e.g., graphics driver 128 of FIGS. 1 and 2). Also in a manner similar to that described above with respect to the determination of the first profile information in block 310, the second profile information may be directly associated with the second application, or may be indirectly associated with the second application, such as based on application type associated with the second application (e.g., a text-based application, a 2D graphical application, a gaming application or other application presenting rendered 3D content, etc. Once the second profile information is determined, the routine 300 proceeds to block 335.

At block 335, the APU modifies the quantity of activated shader engines based on the determined second profile information, such as to a second modified quantity that is greater than or less than the quantity of activated shader engines selected in block 315. In a manner similar to that described above with respect to block 315, modifying the quantity of activated shader engines in accordance with the second profile information may include one or more additional processes to properly save or release state information associated with shader engines to be activated or deactivated. The routine 300 proceeds to block 340.

At block 340, the APU executes the instructions on behalf of the second application using the second modified quantity of activated shader engines.

Figure 4:
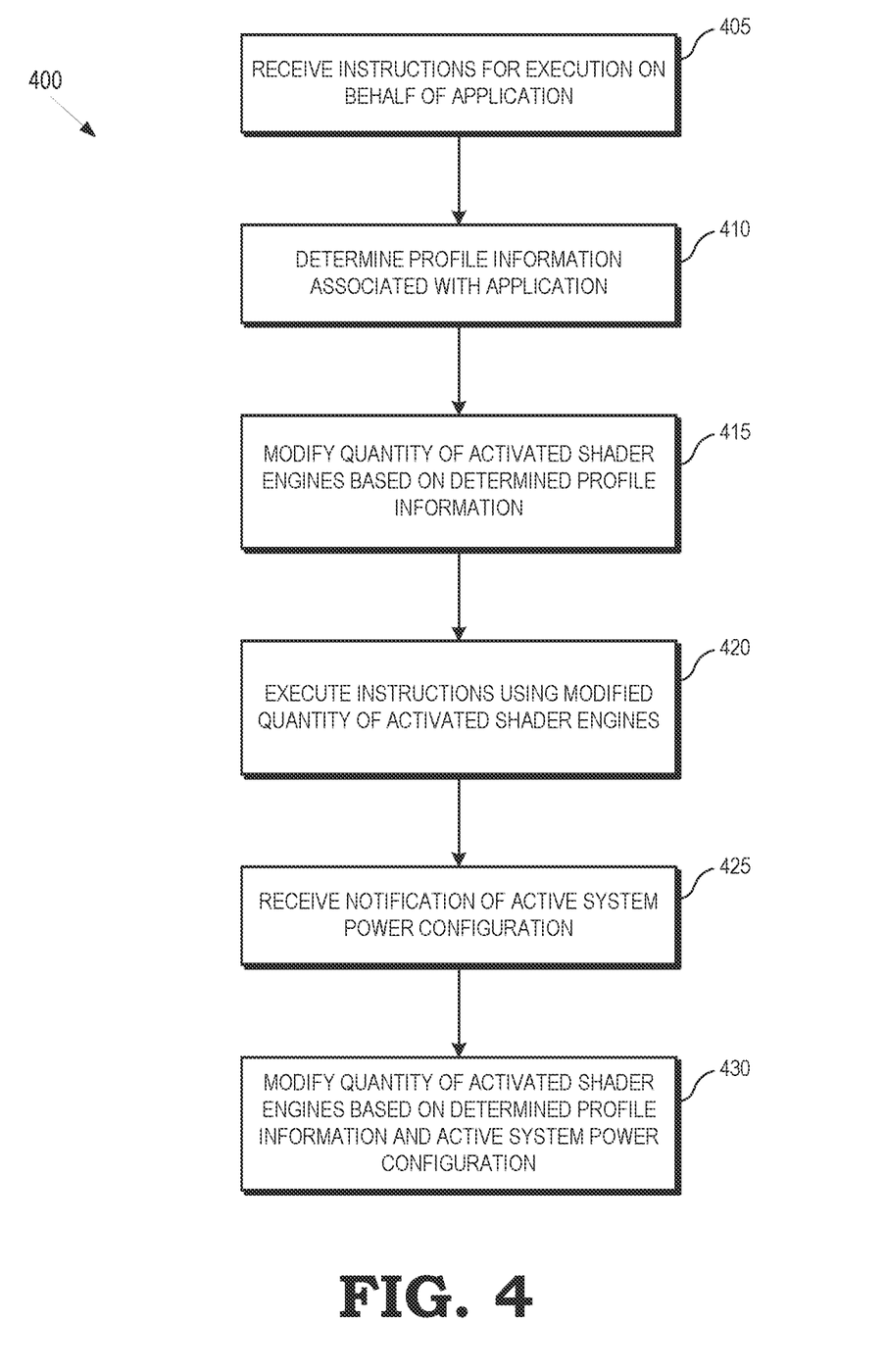
FIG. 4 illustrates an operational routine for selectively activating and deactivating dynamically allocated subsets of shader engines based on application profiles and an active power configuration, in accordance with some embodiments.

FIG. 4 illustrates an operational routine for selectively activating and deactivating dynamically allocated subsets of shader engines based on application profiles and an active power configuration, in accordance with some embodiments. The routine 400 may be performed, for example, by an APU (e.g., APU 115 of FIG. 1) when receiving instructions for execution (e.g., some or all of program code 125 in FIG. 1), such as based on an application profile (e.g., one of application profiles 210 of FIG. 2) and on an active power configuration (e.g., power configuration 230 of FIG. 2).

The routine 400 begins at block 405, in which the APU receives instructions for execution on behalf of a first application. The routine 400 proceeds to block 410.

At block 410, the APU determines profile information associated with the first application (first profile information), such as profile information that is stored as part of a software driver (e.g., graphics driver 128 of FIGS. 1 and 2). As discussed above with respect to operational routine 300 of FIG. 3, the profile information may be directly or indirectly associated with the first application. Once the profile information associated with the first application has been determined, the routine 400 proceeds to block 415.

At block 415, the APU modifies a quantity of activated shader engines in a plurality of shader engines based on the determined first profile information. As discussed above with respect to operational routine 300 of FIG. 3, in various embodiments modifying the quantity of activated shader engines may include one or more additional processes to properly save or release state information associated with shader engines to be activated or deactivated. The routine 400 proceeds to block 420.

At block 420, the APU executes the instructions on behalf of the first application using the modified quantity of activated shader engines. The routine 400 proceeds to block 425.

At block 425, the APU receives a notification of an active system power configuration. In various embodiments, the notification of the active system power configuration may be proactively sent by one or more power monitoring components communicatively coupled to the APU, may be polled from one or more registers or memory locations, etc. The routine 400 proceeds to block 430.

At block 430, the APU modifies the quantity of activated shader engines based on the determined profile information and on the active system power configuration. For example, in certain scenarios and embodiments the quantity of activated shader engines is modified based on whether the plurality of shader engines is currently coupled to an alternating current (AC) power source or a direct current (DC) power source.

In some embodiments, the apparatus and techniques described above are implemented in a system including one or more integrated circuit (IC) devices (also referred to as integrated circuit packages or microchips), such as the Accelerated Processing Units and other devices described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system, comprising:
an accelerated processing unit (APU) comprising a command processor communicatively coupled to a plurality of shader engines of the APU and to a memory, the command processor configured to:
receive, from the memory, one or more instructions for execution on behalf of a first application;
modify, based on profile information indicating an amount of graphics rendering resources utilized by the first application, a quantity of activated shader engines in the plurality of shader engines; and
initiate execution of the one or more instructions for the first application on one or more processors using the modified quantity of activated shader engines.

2. The system of claim 1, wherein the command processor is further configured to:
receive one or more additional instructions for execution on behalf of a second application;
responsive to the one or more additional instructions and based on second profile information associated with the second application, dynamically increase the quantity of activated shader engines in the plurality of shader engines; and
execute the one or more additional instructions on the one or more processors using the increased quantity of activated shader engines.

3. The system of claim 2, wherein to dynamically increase the quantity of activated shader engines includes to initialize a first set of one or more shader engines using state information associated with a second set of one or more shader engines, wherein the one or more shader engines of the second set of shader engines are activated prior to receiving the one or more additional instructions for execution.

4. The system of claim 1, wherein the command processor is further configured to:
receive one or more additional instructions for execution on behalf of a second application;
responsive to the one or more additional instructions and based on second profile information associated with the second application, dynamically decrease the quantity of activated shader engines in the plurality of shader engines; and
execute the one or more additional instructions on the one or more processors using the decreased quantity of activated shader engines.

5. The system of claim 4, wherein to dynamically decrease the quantity of activated shader engines includes to clear state information from a first set of one or more shader engines prior to deactivating the one or more shader engines of the first set of shader engines.

6. The system of claim 1, wherein to modify the quantity of activated shader engines in the plurality of shader engines is further based on a power configuration of the system.

7. The system of claim 6, wherein modifying the quantity of activated shader engines is based on whether the system is currently coupled to an alternating current (AC) power source or a direct current (DC) power source.

8. The system of claim 1, wherein the command processor is further configured to receive the profile information from a graphics driver, and wherein the profile information comprises one application profile of multiple application profiles maintained by the graphics driver.

9. A method comprising:
receiving one or more instructions for execution on behalf of a first application;
modifying, based on profile information indicating an amount of graphics rendering resources utilized by the first application, a quantity of activated shader engines in a plurality of shader engines of a processor; and
executing the one or more instructions for the first application using the modified quantity of activated shader engines.

10. The method of claim 9, further comprising:
receiving one or more additional instructions for execution on behalf of a second application;
responsive to the receiving of the one or more additional instructions and based on second profile information associated with the second application, dynamically increasing the quantity of activated shader engines in the plurality of shader engines; and
executing the one or more additional instructions using the increased quantity of activated shader engines.

11. The method of claim 10, wherein dynamically increasing the quantity of activated shader engines comprises initializing a first set of one or more shader engines using state information associated with a second set of shader engines, the second set of shader engines being activated prior to receiving the one or more additional instructions for execution.

12. The method of claim 9, further comprising:
receiving one or more additional instructions for execution on behalf of a second application;
responsive to the receiving of the one or more additional instructions and based on second profile information associated with the second application, dynamically decreasing the quantity of activated shader engines in the plurality of shader engines; and
executing the one or more additional instructions using the decreased quantity of shader engines.

13. The method of claim 12, wherein dynamically decreasing the quantity of activated shader engines comprises clearing state information from a first set of one or more shader engines prior to deactivating the one or more shader engines of the first set of shader engines.

14. The method of claim 9, wherein modifying the quantity of activated shader engines in the plurality of shader engines is further based on a power configuration of a computing system that includes the plurality of shader engines.

15. The method of claim 14, wherein modifying the quantity of activated shader engines is based on whether the computing system is currently coupled to an alternating current (AC) power source or a direct current (DC) power source.

16. The method of claim 9, further comprising determining the profile information associated with the first application based on heuristic analysis of one or more analyzed applications.

17. The method of claim 16, wherein the one or more analyzed applications include the first application.

18. The method of claim 9, further comprising receiving the profile information from a software driver, the profile information comprising one application profile of multiple application profiles maintained by the software driver.

19. The method of claim 18, further comprising selecting the one application profile from the multiple application profiles based on an application type of the first application.

20. A command processor configured to:
receive, from a graphics driver, one or more instructions for execution on behalf of a first application;
modify, based on profile information indicating an amount of graphics rendering resources utilized by the first application, a quantity of activated shader engines in a plurality of shader engines coupled to the command processor; and
initiate execution of the one or more instructions for the first application using the modified quantity of activated shader engines.

* * * * *